Patented Dec. 23, 1924.

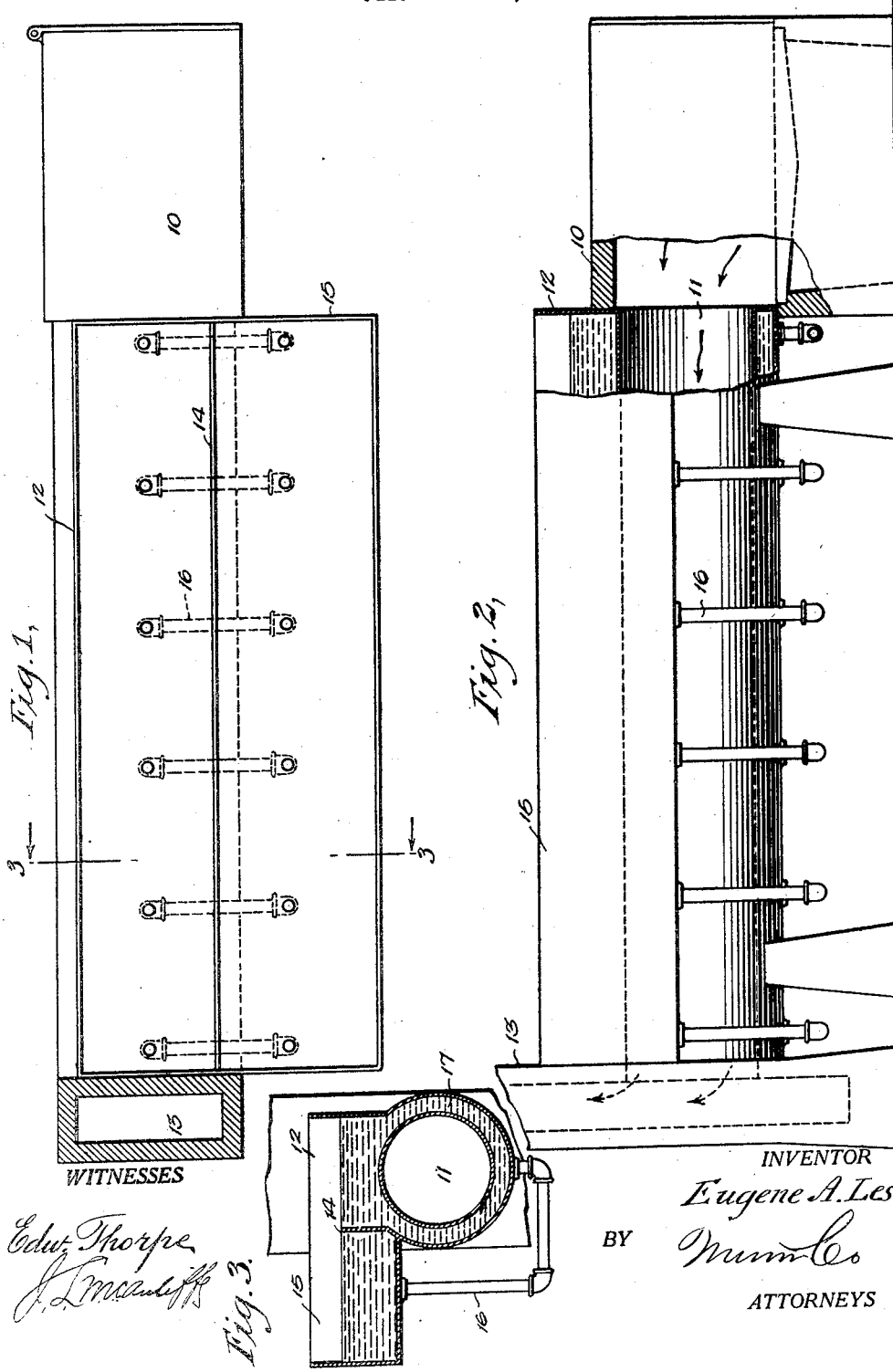

1,520,582

UNITED STATES PATENT OFFICE.

EUGENE ALLSY LESTER, OF PUNTA GORDA, BRITISH HONDURAS.

SIRUP PAN.

Application filed December 29, 1923. Serial No. 683,442.

*To all whom it may concern:*

Be it known that I, EUGENE A. LESTER, a citizen of the United States of America, and a resident of Punta Gorda, British Honduras, have invented a new and Improved Sirup Pan, of which the following is a description.

My invention relates to a pan for reducing cane sirup.

The general object of my invention is to provide a sirup pan improved in various particulars more especially with a view to obtain the maximum heating surface and to apply the heat with the maximum efficiency. More specific objects of the invention are to provide a sirup pan so formed that a still pan section is provided from which the scum may be conveniently removed and to coordinate the still pan section with the boiling area of the pan in a manner making for effective circulation of the sirup between the two.

The nature of my invention and its distinguishing features and characteristics can best be explained in connection with a specific embodiment of the invention as hereinafter given.

Reference is to be had to the accompanying drawings forming a part of this specification, it being understood that the drawings are merely illustrative of one example of the invention.

Figure 1 is a plan view of a sirup pan embodying my invention, the chimney being in horizontal section;

Figure 2 is a view of the sirup pan partly in side elevation and partly in section;

Figure 3 is a transverse vertical section as indicated by the line 3—3, Figure 1.

In carrying out my invention in practice in accordance with the illustrated example, a suitable furnace 10 is provided at one end of the pan.

From said furnace extends a horizontal flue 11 enclosed at all sides. The flue 11 extends through the sirup pan designated generally by the numeral 12, said pan at the bottom extending in curved form about the flue 11 so that double walls are provided presenting an intermediate space 17 for the sirup between the flue and the shell of the pan. Thus the sirup entirely surrounds the horizontal flue. Said flue 11 leads to a suitable outlet, there being conventionally indicated a chimney 13.

The pan 12 is extended laterally at a side of the flue 11 and above the same and is provided with a vertical partition 14 extending longitudinally of the pan, thereby providing a still auxiliary pan section 15 extending along one side of the pan. A pipe 16 leads from the bottom of the pan section 15 downwardly and then upwardly to a connection with the space 17 at the bottom of the pan 12 below the flue 11 whereby to maintain efficient circulation of the sirup from the bottom of the pan 15 to the bottom of the main pan section.

The described construction presents the maximum area of the pan 12 to the heat of the products of combustion passing from the furnace through the flue 11. The scum may be conveniently removed at the pan section 15 and at all times an efficient circulation is maintained. The results are also obtained by a very simple construction.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A sirup pan having a horizontal open-ended flue extending therethrough and surrounded at all sides by the sirup space, the lower portion of the pan being circular, the shell of the pan forming with said flue a double wall presenting an intermediate curved space for the sirup, said pan being extended laterally at the top at one side to provide a still pan section, said still pan section being separated from the remainder of the pan by a vertical partition; together with a circulating pipe establishing connection between the bottom of the still pan section and the main portion of the pan beneath the flue.

2. A sirup pan having a horizontal open-ended flue extending therethrough, the shell of the pan forming with the flue a double wall presenting an intermediate space for the sirup, said pan having a lateral extension at one side forming a still pan section from which the scum may be removed; together with a pipe connecting the bottom of the still pan section with the main pan section below the flue.

EUGENE ALLSY LESTER.